Patented Nov. 29, 1949

2,489,894

UNITED STATES PATENT OFFICE 2,489,894

PENICILLAMINE ESTERS

Edward A. Kaczka and James F. McPherson, Rahway, Ralph Mozingo, Elizabeth, and Karl Folkers, Plainfield, N. J., assignors to Merck & Co., Inc., Rahway, N. J., a corporation of New Jersey No Drawing. Application December 22, 1945, Serial No. 637,102

7 Claims. (Cl. 260—481)

This invention relates to certain new chemical compounds; more particularly to esters of penicillamine which are useful as intermediates in the synthesis of penicillin and other chemically related compounds having antibiotic activity; and to processes for preparing such compounds.

In preparing esters of penicillamine, we use as starting materials penicillamine in either the d-("unnatural") or the dl-(synthetic) form or hydrohalides thereof. d-Penicillamine is readily prepared by hydrolyzing a salt of penicillin with hot dilute mineral acid (Nature 151, 107 (1-23-43)). This treatment results in the evolution of one molecule of carbon dioxide with the formation of an amino acid called penicillamine. Penicillamine can also be prepared by other degradation processes, and has been identified by analytic and synthetic methods as d-$\beta,\beta$-dimethyl-cysteine, or d-$\alpha$-amino-$\beta$-mercaptoisovaleric acid. Penicillamine with the same steric configuration is derived from F and G penicillin.

Synthetic or dl-penicillamine can be prepared by reacting $\alpha$-amino-$\beta$-methoxy isovaleric acid with acetic anhydride and triethyl amine, removing the solvents, dissolving the 2-methyl-4-isopropylidene-5-oxazolone thus formed in methanol and reacting with a solution of sodium in methanol saturated with hydrogen sulfide to form N-acetyl penicillamine, converting this compound to penicillamine hydrochloride by reacting with hydrochloric acid, and thence to the free dl-penicillamine by treating the hydrochloride with a base. (dl-Penicillamine hydrochloride is obtained directly by merely omitting the final treatment with a base). Details of this synthesis are fully set forth in a copending joint application of two of the present applicants, Serial No. 656,512, filed March 22, 1946, now U. S. Patent 2,477,148.

Synthetic d- and l-penicillamine can be prepared by resolution with alkaloids of the S-benzyl-N-acyl or the N-acyl-derivative of dl-penicillamine. Hydrochlorides of the synthetic d- and l-penicillamine can in turn be prepared by reacting d- or l-penicillamine with aqueous hydrogen chloride (about 2 to 3 N), concentrating to small volume, preferably under reduced pressure, removing traces of water by washing with absolute alcohol and then with benzene under reduced pressure, and crystallizing the hydrochloride by trituration with dry ether.

In preparing esters of penicillamine in accordance with the present invention, penicillamine hydrochloride, either as the racemic dl-compound or as an individual d- or l-isomer, is reacted with an anhydrous alcohol, such as absolute methanol, absolute ethanol or the like, which is saturated with anhydrous hydrogen chloride. The solution is heated, preferably under reflux, for an extended period of time, thereby forming the corresponding ester hydrochloride of penicillamine. The particular ester which is formed depends upon the alcohol used in this reaction and it should be understood that methyl, ethyl, benzyl and other esters can be prepared by the process of the present invention by selecting as starting material, the corresponding anhydrous alcohol.

The ester hydrochloride of penicillamine is converted to the free ester by neutralizing an aqueous solution of the ester hydrochloride with sodium bicarbonate, extracting the neutralized solution with chloroform, removing traces of water from the extract, as for example, by drying over anhydrous sodium sulfate, and removing the chloroform under reduced pressure. Ester hydrochlorides of penicillamine, such as the methyl and ethyl hydrochlorides, are crystalline and are therefore more readily handled and purified than the free esters. It will be apparent, however, that the ester hydrochlorides and free esters are readily converted one to the other; the ester hydrochloride being converted to the free ester as above described and the free ester being converted to the ester hydrochloride by dissolving in anhydrous ether and adding anhydrous hydrogen chloride, thereby forming a precipitate of the crystalline ester hydrochloride.

The following examples illustrate methods of carrying out the present invention, but it is to be understood that these examples are given by way of illustration and not of limitation.

Example 1

Fifty milligrams (0.27 millimole) of d-$\alpha$-amino-$\beta$-mercaptoisovaleric acid hydrochloride was dissolved in 5 cc. of absolute methanol saturated with anhydrous hydrogen chloride and the solution refluxed on the water bath for five hours. The reaction mixture was then evaporated to dryness under reduced pressure at room temperature; the crystalline residue dissolved in four drops of methanol and anhydrous ether added until the solution became cloudy and let stand overnight in the cold. The lustrous needles of ester hydrochloride (methyl-d-penicillamine hydrochloride) were separated, washed three times with 5 cc.-portions of ether and dried; M. P. 143-147° (with decomposition) (micro-block), M. P. 180–181° C. (with decomposition) (capillary tube). Yield 12.8 mg. (23.8%).

Analysis calculated for $C_6H_{14}O_2NSCl$: C, 36.08; H, 7.07; N, 7.01. Found: C, 36.27; H, 6.61; N, 7.98; C, 36.70; H, 6.92; N, 7.41; C, 36.38; H, 6.62; N, 7.19.

*Example 2*

Nine and one-half grams (0.0511 mole) of dl-$\alpha$-amino-$\beta$-mercaptoisovaleric acid hydrochloride was dissolved in 200 cc. of absolute methanol saturated with anhydrous hydrogen chloride and refluxed on the steam bath for 40 hours. The solution was concentrated to one-fourth volume and anhydrous ether added until cloudiness appeared. After standing overnight in the cold, the crystalline ester hydrochloride (methyl-dl-penicillamine-hydrochloride) was collected, washed with ether and dried; M. P. 168–168.5° C. (with decomposition). Yield 4.16 g. (40.8%). Recrystallization from ethyl acetate gave a product melting at 163–164° C. (with decomposition).

Analysis calculated for $C_6H_{14}O_2NSCl$: C, 36.08; H, 7.07; N, 7.01. Found: C, 36.19; H, 7.13; N, 6.94.

The methyl ester hydrochloride was dissolved in 25 cc. of water, neutralized with sodium bicarbonate and extracted four times with 10 cc. portions of chloroform; the extract was dried over anhydrous sodium sulfate and the chloroform removed under reduced pressure. The free ester was then dissolved in anhydrous ether and precipitated as the hydrochloride with anhydrous hydrogen chloride. The crystalline product after drying melted at 167–168° C. (with decomposition).

*Example 3*

Five grams of dl-$\alpha$-amino-$\beta$-mercaptoisovaleric acid hydrochloride was dissolved in 250 cc. of absolute ethanol saturated with anhydrous hydrogen chloride and the solution refluxed on the steam bath for 45 hours. The reaction mixture was then evaporated to dryness and the residue recrystallized from ethyl acetate; M. P. 151–152° C. Yield, 2.5 gms. (43.4%). After two recrystallizations from ethyl acetate, the melting point was constant at 150–151° C. Conversion to the free ester (ethyl-dl-penicillamine) and reprecipitation of the hydrochloride in anhydrous ether with anhydrous hydrogen chloride gave a crystalline product; M. P. 150–151° C.

Analysis calculated for $C_7H_{16}O_2NSCl$; C, 39.33; H. 7.55; N, 6.55. Found: C, 39.42; H, 7.85; N, 6.56; C, 39.37; H, 7.71.

*Example 4*

One and ninety-five hundredths grams of dl-penicillamine hydrochloride was dissolve in 30 ml. of absolute methanol and the solution saturated with anhydrous hydrogen chloride. This solution was heated for two hours at 60–70° C.; then the solvent evaporated in vacuo, the residue dissolved in anhydrous methanol and again saturated with anhydrous hydrogen chloride. This solution was heated at reflux for twenty hours and then evaporated to dryness in vacuo. The residue was dissolved in methanol, filtered and an equal volume of ether added. The crystalline precipitate, dl-penicillamine methyl ester hydrochloride, was collected and dried. Yield, 0.3 gm., M. P. 156–156.5° C. After precipitation from methanol by addition of ether, dl-penicillamine methyl ester hydrochloride melted at 165–167° C. (with decomposition).

Analysis calculated for $C_6H_{14}NO_2SCl$: C, 36.08; H, 7.07; N, 7.01. Found: C, 35.94; H, 6.91; N, 7.32.

*Example 5*

A solution of 60 g. of d-penicillamine hydrochloride and 290 g. of hydrogen chloride in 1 liter of methyl alcohol was refluxed twenty-one hours. The solution was diluted with 100 ml. of benzene and concentrated to dryness under reduced pressure. The residue was taken up in hot ethyl acetate (about 1 liter). Cooling the ethyl acetate gave 24 g. of the d-penicillamine methyl ester hydrochloride; M. P. 182–183° C. (with decomposition).

*Example 6*

From 4.5 g. of d-penicillamine hydrochloride, 2 g. of the methyl ester was obtained after heating for forty-eight hours in another preparation. This d-penicillamine methyl ester hydrochloride melted at 179–180° C. (with decomposition) and had $(\alpha)_D^{25}$ $-7.4$ (c, .1 in water) and after recrystallization from methanol-ether melted at 180–181° C. and had the following analysis.

Analysis calculated for $C_6H_{14}O_2SNCl$: C, 36.08; H, 7.07; N, 7.01. Found: C, 36.13; H, 6.95; N, 6.96.

*Example 7*

A solution of 25 g. of d-penicillamine hydrochloride and 150 g. of hydrogen chloride in 500 ml. of 2BA ethyl alcohol was heated on the steam bath for nineteen hours. The alcohol was removed under reduced pressure. The residue was taken up in a small amount (about 40 ml.) of ethanol and 450 ml. of ether added. The precipitated d-penicillamine ethyl ester hydrochloride came out in long needles; M. P. 158–160° C., $(\alpha)_D^{25}+5.1°$ (c, 1.01 in water). This crop of crystals weighed 11 g.

The mother liquors from the recrystallization were evaporated under reduced pressure and again taken up in a small amount of ethyl alcohol and precipitated with ether. These crystals were recrystallized from ethyl acetate to give 5.2 g. of the d-penicillamine ethyl ester hydrochloride melting at 159–160° C. The analytical sample melted at 161–162° C.

Analysis calculated for $C_7H_{16}O_2SNCl$: C, 39.34; H, 7.55; N, 6.55. Found: C, 39.30; H, 7.70; N, 6.46.

*Example 8*

A mixture of 14.9 g. of d-penicillamine hydrochloride and 200 ml. of benzyl alcohol containing a small amount of dry hydrogen chloride was heated on the steam bath overnight. A little water separated out on the walls of the flask. About 50 ml. of benzene was added and was removed at reduced pressure. On dilution with petroleum ether, an oil came down. The petroleum ether was decanted and portions of the oil were dissolved in ethyl alcohol and ether added; an oil came out. The d-penicillamine benzyl ester hydrochloride remained as an oil.

Modifications can be made in the procedures herein described without departing from the spirit and scope of the present invention and we are to be limited only by the appended claims.

We claim:
1. Methyl penicillamine hydrochloride.
2. Ethyl penicillamine hydrochloride.
3. Benzyl penicillamine hydrochloride.
4. Methyl-d-penicillamine hydrochloride.
5. Ethyl-d-penicillamine hydrochloride.
6. Benzyl-d-penicillamine hydrochloride.
7. A substance of the class consisting of monohydric alcohol esters and ester hydrochlorides of

α-amino-β-mercaptoisovaleric acid and stereoisomers thereof, wherein the alcohol is selected from the group consisting of lower alkyl and lower aralkyl alcohols.

EDWARD A. KACZKA.
    JAMES F. McPHERSON.
    RALPH MOZINGO.
    KARL FOLKERS.

REFERENCES CITED

The following references are of record in the file of this patent:

UNITED STATES PATENTS

| Number | Name | Date |
|---|---|---|
| 2,406,362 | Farlow | Aug. 27, 1946 |
| 2,430,455 | Crooks | Nov. 11, 1947 |

OTHER REFERENCES

Cherbuliez et al.: "Chemical Abstracts," vol. 23 (1929), p. 5161; abstract of "Helv. Chim. Acta," vol. 12 (1929), pp. 317–329.

Abderhalden et al.: "Chemical Abstracts," vol. 26 (1932) p. 1629; abstract of "Fermentforschung," vol. 13 (1931), pp. 97–114.

Harington et al.: "Biochem. J.," vol. 30 (1936), p. 1605.

Sullivan et al.: "Chemical Abstracts," vol. 37 (1943), p. 900; abstract of "J. Wash. Acad. Sci.," vol. 32 (1942), pp. 285–287.

Abraham et al.: Nature, vol. 151 (1943), p. 107.

British Report 13, CPS–19, Feb. 16, 1944, pp. 1 and 2.

Parke Davis Report PD–10, CPS–251, April 14, 1944, p. 2.

Univ. of Michigan Report B–4, CPS–153, May 1, 1944, p. 2.

British Report 66, CPS–72, June 2, 1944, p. 2.

Upjohn Report, U–7, CPS–104, June 8, 1944, page 34.

British Report 125, CPS–341, Nov. 29, 1944, p. 1.